(12) United States Patent
Mills

(10) Patent No.: US 11,880,757 B2
(45) Date of Patent: *Jan. 23, 2024

(54) NEURAL NETWORK PROCESSOR FOR HANDLING DIFFERING DATATYPES

(71) Applicant: Apple Inc., Cupertino, CA (US)

(72) Inventor: Christopher L Mills, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,960

(22) Filed: Jan. 11, 2023

(65) Prior Publication Data
US 2023/0169308 A1    Jun. 1, 2023

Related U.S. Application Data

(63) Continuation of application No. 15/971,868, filed on May 4, 2018, now Pat. No. 11,580,353.

(51) Int. Cl.
  *G06N 3/04* (2023.01)
  *G06N 3/08* (2023.01)
  *G06F 7/523* (2006.01)
  *G06F 7/50* (2006.01)

(52) U.S. Cl.
  CPC ............... *G06N 3/04* (2013.01); *G06F 7/50* (2013.01); *G06F 7/523* (2013.01); *G06N 3/08* (2013.01)

(58) Field of Classification Search
  CPC .... G06N 3/08; G06N 3/04; G06F 7/50; G06F 7/523
  See application file for complete search history.

(56) References Cited

U.S. PATENT DOCUMENTS 11,580,353 B2 * 2/2023 Mills ............... G06F 7/5443

\* cited by examiner

*Primary Examiner* — Zachary K Huson
(74) *Attorney, Agent, or Firm* — Sterne, Kessler, Goldstein & Fox P.L.L.C.

(57) ABSTRACT

Embodiments relate to a neural engine circuit that includes an input buffer circuit, a kernel extract circuit, and a multiply-accumulator (MAC) circuit. The MAC circuit receives input data from the input buffer circuit and a kernel coefficient from the kernel extract circuit. The MAC circuit contains several multiply-add (MAD) circuits and accumulators used to perform neural networking operations on the received input data and kernel coefficients. MAD circuits are configured to support fixed-point precision (e.g., INT8) and floating-point precision (FP16) of operands. In floating-point mode, each MAD circuit multiplies the integer bits of input data and kernel coefficients and adds their exponent bits to determine a binary point for alignment. In fixed-point mode, input data and kernel coefficients are multiplied. In both operation modes, the output data is stored in an accumulator, and may be sent back as accumulated values for further multiply-add operations in subsequent processing cycles.

20 Claims, 14 Drawing Sheets

NEURAL NETWORK PROCESSOR FOR HANDLING DIFFERING DATATYPES

CROSS REFERENCE TO RELATED APPLICATIONS

This application is a continuation of U.S. application Ser. No. 15/971,868, filed May 4, 2018, which is incorporated by reference in its entirety.

BACKGROUND

1. Field of the Disclosure

The present disclosure relates to a circuit for instantiating neural networks and more specifically to handing neural network operations using different types of data.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), deep neural networks (DNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, number of channels in input data, kernel data to be used, non-linear function to be applied to convolution result, and applying of various post processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of a central processing unit (CPU) as well as increase the overall power consumption.

SUMMARY

Embodiments relate to a neural engine circuit that includes an input buffer circuit, a kernel extract circuit, and a multiply-accumulator (MAC) circuit. The input buffer circuit broadcasts input data to the MAC circuit. The kernel extract circuit sends kernel coefficients to the MAC circuit. The MAC circuit includes multiply-add (MAD) circuits and accumulator circuits used to perform neural networking operations on the received input data and kernel coefficients. Each MAD circuit includes a multiplier, a shift register, an adder, an exponent adder, and a shift offset register. Each MAD circuit supports a fixed-point precision of operands (e.g., INT8) and a floating-point precision of operands (e.g., FP16).

In one embodiment, each MAD circuit in a fixed-point operation mode operates on fixed-point input data and kernel coefficients using a multiplier and adder while turning off unused devices for power conservation. Each MAD circuit in a floating-point operation mode separates input data and kernel coefficients into integer bits and exponent bits. The integer bits of the input data are multiplied with the integer bits of a kernel coefficient. A binary point position for the product of the multiplied integer bits is determined by adding the exponent bits of the input data and kernel coefficient to a binary point value. The multiplied integer is shifted into position using the shift register. In both operation modes, the processed values are stored in an accumulator circuit, and may be sent back as feedback information for further multiply-add operations in subsequent processing cycles.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a neural engine circuit for performing neural network operations using input data and kernel data in a fixed-point precision or a floating-point precision. Each neural engine circuit includes an input buffer circuit, a kernel extract circuit, and a multiply-accumulator (MAC) circuit. The MAC circuit includes several multiply-add (MAD) circuits and several accumulator circuits. The MAD circuits are used for performing multiply-add operations on input data and kernel coefficients having either fixed-point precision, floating-point precision, or both. The output data generated by the MAD circuits is stored in an accumulator circuit to be reused during subsequent processing cycles.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
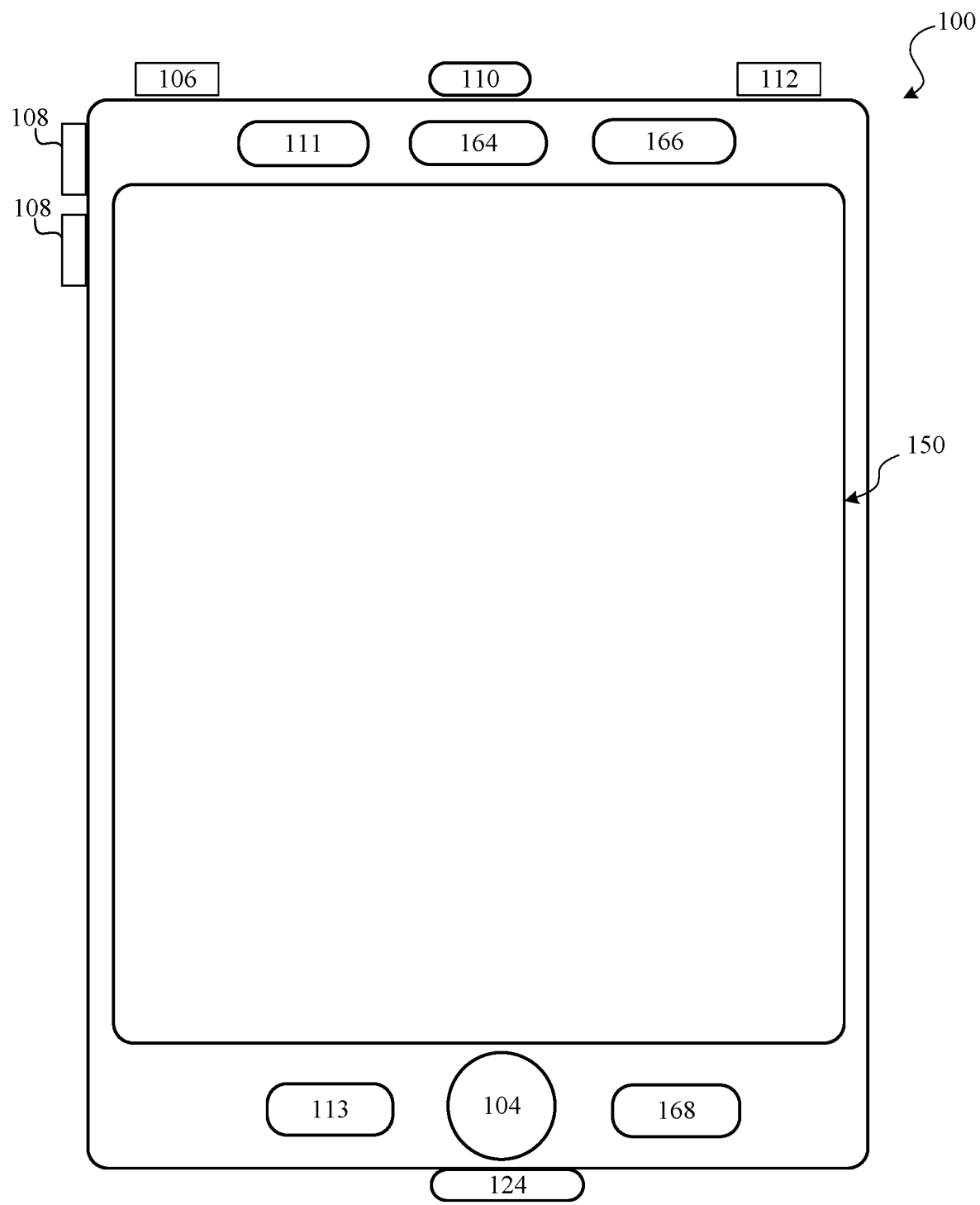
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
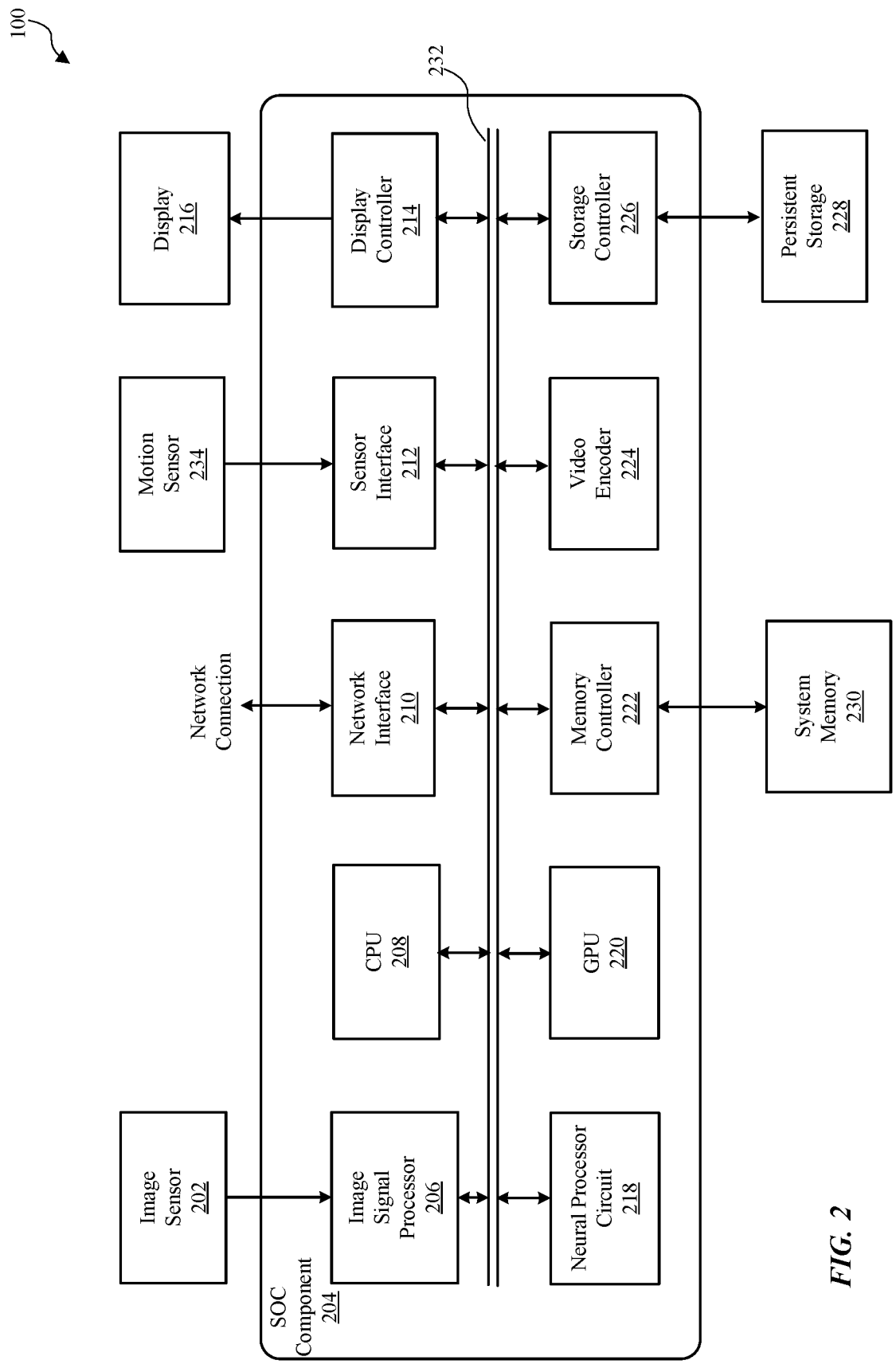
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, motion (orientation) sensor 234, and display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensor 202 is a component for capturing image data and may be embodied, for example, as a complementary metal-oxide-semiconductor (CMOS) active-pixel sensor a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computations including multiplication, addition and accumulation. Such computations may be arranged to perform, for example, convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 302, the image signal processor 206, system memory 230 or other sources such as network interface 210 or GPU 220. The output of neural processor circuit 218 may be provided to various components of device 100 such as the image signal processor 206, system memory 230 or CPU 208 for various operations. The structure and operation of neural processor circuit 218 is described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

Example Neural Processor Circuit

Neural processor circuit 218 is a configurable circuit that performs neural network operations on the input data based at least on kernel data 340. For this purpose, neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data buffer 318 and buffer DMA 320. Neural processor circuit 218 may include other components not illustrated in FIG. 3.

Each of neural engines 314 performs computing operations for neural network operations in parallel. Depending on the load of operation, entire set of neural engines 314 may be operated or only a subset of the neural engines 314 may be operated while the remaining neural engines 314 are placed in a power save mode to conserve power. Each of neural engines 314 includes components for storing one or more kernels, for performing multiply-accumulate operations, and for post-processing to generate an output data 328, as described below in detail with reference to FIG. 4. One example of a neural network operation is a convolution operation.

Figure 3:
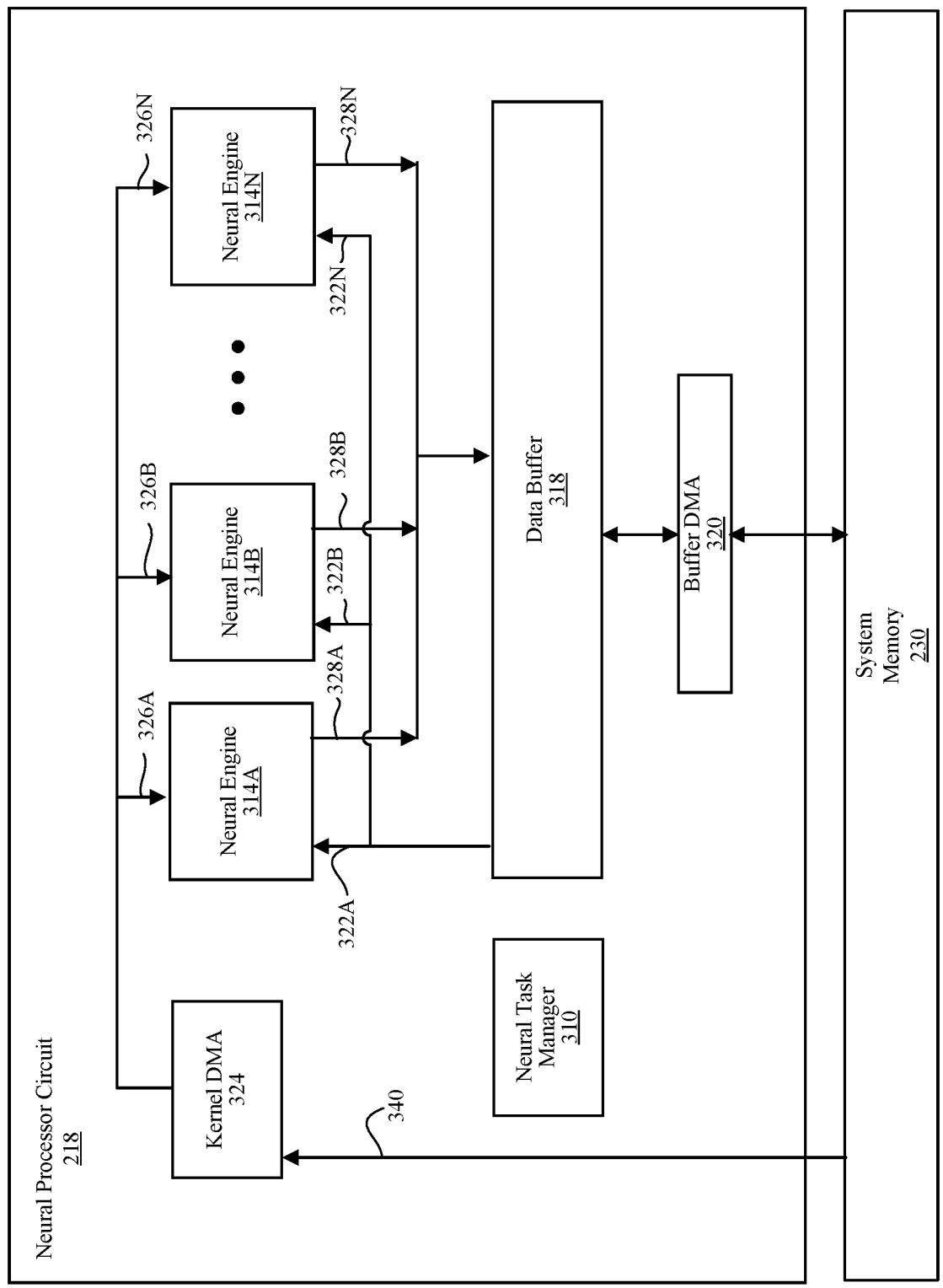
FIG. 3 is a block diagram illustrating a neural processor circuit, according to one embodiment.

Neural task manager 310 manages the overall operation of neural processor circuit 218. Neural task manager 310 may receive a task list from a compiler executed by CPU 208, store tasks in its task queues, choose a task to perform, and send instructions to other components of the neural processor circuit 218 for performing the chosen task. Neural task manager 310 may also perform switching of tasks on detection of events such as receiving instructions from CPU 208. In one or more embodiments, the neural task manager 310 sends rasterizer information to the components of the neural processor circuit 218 to enable each of the components to track, retrieve or process appropriate portions of the input data and kernel data, as described below in detail with reference to FIGS. 5 through 7. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances.

Data buffer 318 is a temporary storage for storing data associated with the neural network operations. In one embodiment, data buffer 318 is embodied as a memory that can be accessed by all of the neural engines 314. Data buffer 318 may store input data 322A through 322N for feeding to corresponding neural engines 314A through 314N, as well as output from each of neural engines 314A through 314N for feeding back into neural engines 314 or sending to a target circuit (e.g., system memory 230). The operations of data buffer 318 and other components of the neural processor circuit 218 are coordinated so that the input data and intermediate data stored in the data buffer 318 is reused across multiple operations at the neural engines 314, and thereby reduce data transfer to and from system memory 230. Data buffer 318 may be operated in a broadcast mode where input data of all input channels are fed to all neural engines 314 or in a unicast mode where input data of a subset of input channels are fed to each neural engine 314.

The input data 322 stored in data buffer 318 can be part of, among others, image data, histogram of oriented gradients (HOG) data, audio data, meta data, output data 328 of a previous cycle of the neural engine 314, and other processed data received from other components of the SOC component 204.

Buffer DMA 320 includes a read circuit that receives a portion (e.g., tile) of the input data from a source (e.g., system memory 230) for storing in data buffer 318, and a write circuit that forwards data from data buffer 318 to a target (e.g., system memory).

Example Neural Engine Architecture

Figure 4:
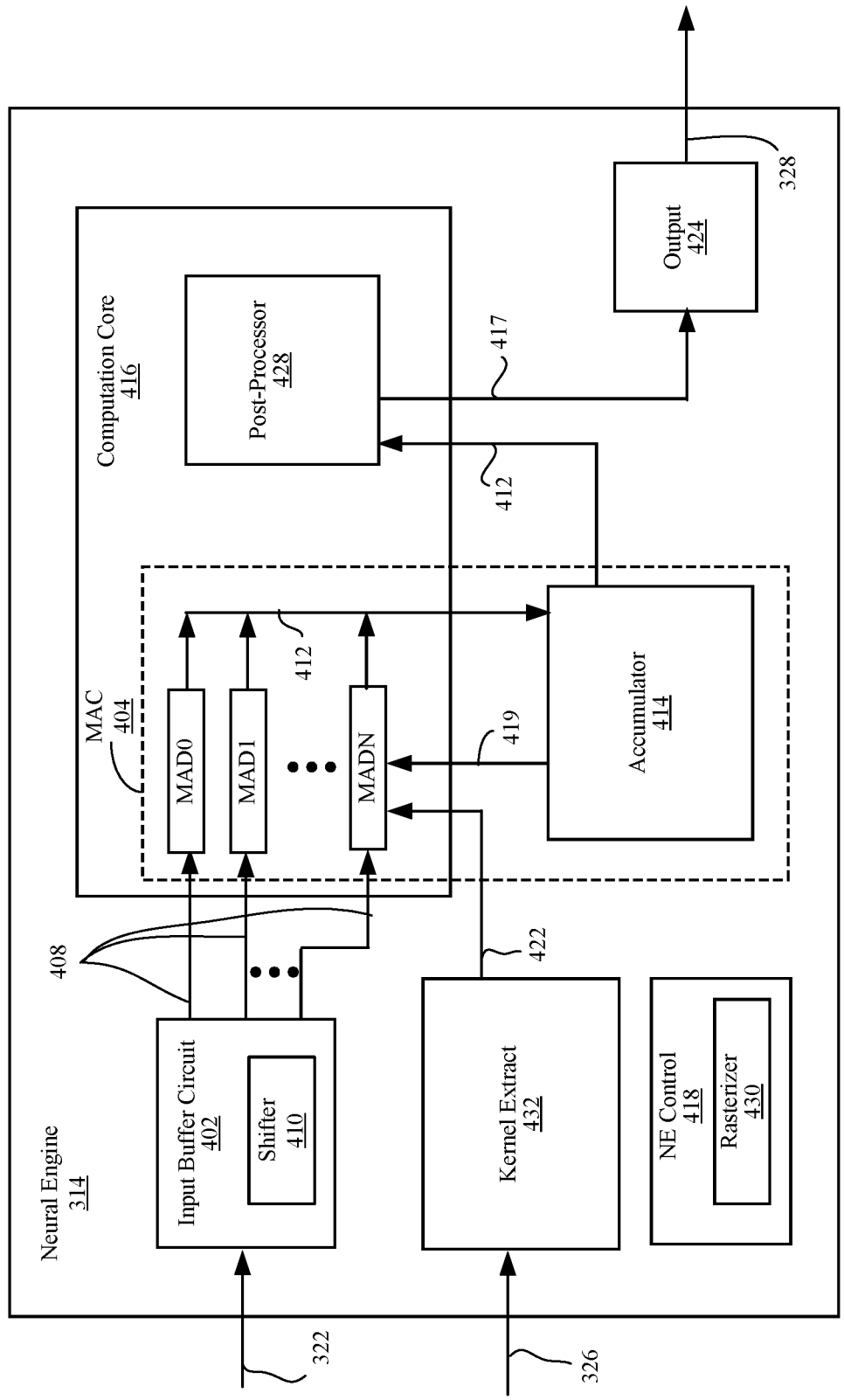
FIG. 4 is a block diagram of a neural engine in the neural processor circuit, according to one embodiment.

FIG. 4 is a block diagram of the neural engine 314, according to one embodiment. The neural engine 314 performs various operations to facilitate neural network operations such as convolution, spatial pooling and local response normalization. The neural engine 314 receives the input data 322, performs multiply-accumulate operations (e.g., convolution operations) on the input data 322 based on stored kernel data, performs further post-processing operations on the result of the multiply-accumulate operations, and generates the output data 328. The input data 322 and/or the output data 328 of the neural engine 314 may be of a single channel or multiple channels.

Neural engine 314 may include, among other components, input buffer circuit 402, computation core 416, neural engine (NE) control 418, kernel extract circuit 432, accumulators 414 and output circuit 424. Neural engine 314 may include further components not illustrated in FIG. 4.

Input buffer circuit 402 is a circuit that stores a portion of the input data 322 as it is received from the data buffer 318 and sends an appropriate portion 408 of input data for a current task or process loop to computation core 416 for processing. Input buffer circuit 402 includes a shifter 410 that shifts read locations of input buffer circuit 402 to change the portion 408 of input data sent to computation core 416. By changing portions of input data provided to the computation core 416 via shifting, neural engine 314 can perform multiply-accumulate for different portions of input data based on fewer number of read operations. In one or more embodiments, the input data 322 includes data of different convolution groups and/or input channels.

Kernel extract circuit 432 is a circuit that receives kernel data 326 from kernel DMA 324 and extracts kernel coefficients 422. In one embodiment, the kernel extract circuit 432 references a look up table (LUT) and uses a mask to reconstruct a kernel from compressed kernel data 326. The mask indicates locations in the reconstructed kernel to be padded with zero and remaining locations to be filled with numbers. The kernel coefficients 422 of the reconstructed kernel are sent to computation core 416 to populate register in multiply-add (MAD) circuits of computation core 416. In other embodiments, the kernel extract circuit 432 receives kernel data in an uncompressed format and the kernel coefficients are determined without referencing a LUT or using a mask.

Computation core 416 is a programmable circuit that performs computation operations. For this purpose, the computation core 416 may include MAD circuits MAD0 through MADN and a post-processor 428. Each of MAD circuits MAD0 through MADN may store an input value in the portion 408 of the input data and a corresponding kernel coefficient in the kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to MAC circuit while data stored in a second subunit of accumulator 414 is sent to post-processor 428.

Post-processor 428 is a circuit that performs further processing of values 412 received from accumulator 414. The post-processor 428 may perform operations including, but not limited to, applying nonlinear functions (e.g., Rectified Linear Unit (ReLU)), normalized cross-correlation (NCC), merging the results of performing neural operations on 8-bit data into 16-bit data, and local response normalization (LRN). The result of such operations is output from the post-processor 428 as processed values 417 to output circuit 424.

NE control 418 controls operations of other components of the neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAD circuits, and perform different types of post-processing operations at post processor 428. To configure components of the neural engine 314 to operate in a desired manner, the NE control 418 sends a control signal to components of the neural engine. NE control 418 may also include rasterizer 430 that tracks the current task or process loop being processed at neural engine 314, as described below in detail with reference to FIG. 5 through 7.

Output circuit 424 receives processed values 417 from the post-processor 428 and interfaces with data buffer 318 to store processed values 417 in data buffer 318. For this purpose, output circuit 424 may send out as output data 328 in a sequence or a format that is different from the sequence or format in which the processed values 417 are processed in post-processor 428.

The components in the neural engine 314 may be configured during a configuration period by the NE control 418 and the neural task manager 310. For this purpose, the neural task manager 310 sends configuration information to the neural engine 314 during the configuration period. The configurable parameters and modes may include, but are not limited to, mapping between input data elements and kernel elements, the number of input channels, the number of output channels, performing of output strides, and enabling/ selection of post-processing operations at the post processor 428.

Operation of Segmenting of Data for Processing at Neural Processor Circuit

Input data is typically split into smaller pieces of data for parallel processing at multiple neural engines 314. Often multiple cycles of operations are performed to generate output for a task associated with a neural network. A compiler executed by CPU 208 analyzes the hierarchy and nodes of the neural network and determines how the input data is to be segmented based on the hardware constraints of the neural processor circuit 218. One of functions of the compiler is to determine how input data is to be split into smaller data units for processing at the neural engines 314, and how the processing is to be iterated in loops to produce the result for tasks.

Figure 5:
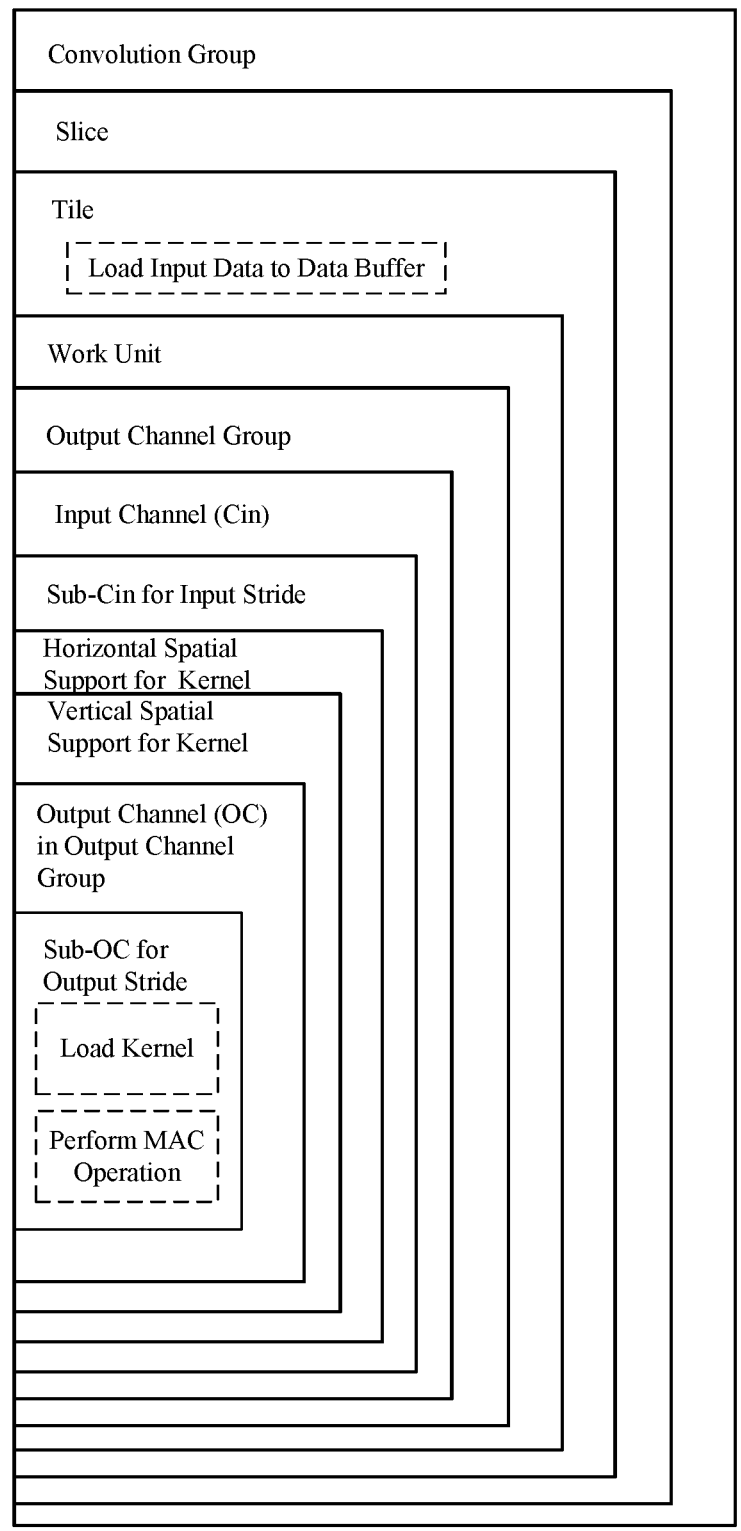
FIG. 5 is a conceptual diagram illustrating loops for processing input data at the neural processor circuit, according to one embodiment.

FIG. 5 is a conceptual diagram illustrating loops for processing the input data at neural processor circuit 218, according to one embodiment. The outermost loop represents processing for a convolution group, if group convolution involving multiple convolution group is used. Group convolutions are convolutions where input data of the input channels in each group are used only for generating output data of output channels of each group but are not used for generating output data for output channels of other groups. Hence, each group of the group convolution can be treated as a separate convolution operation.

Figure 6:
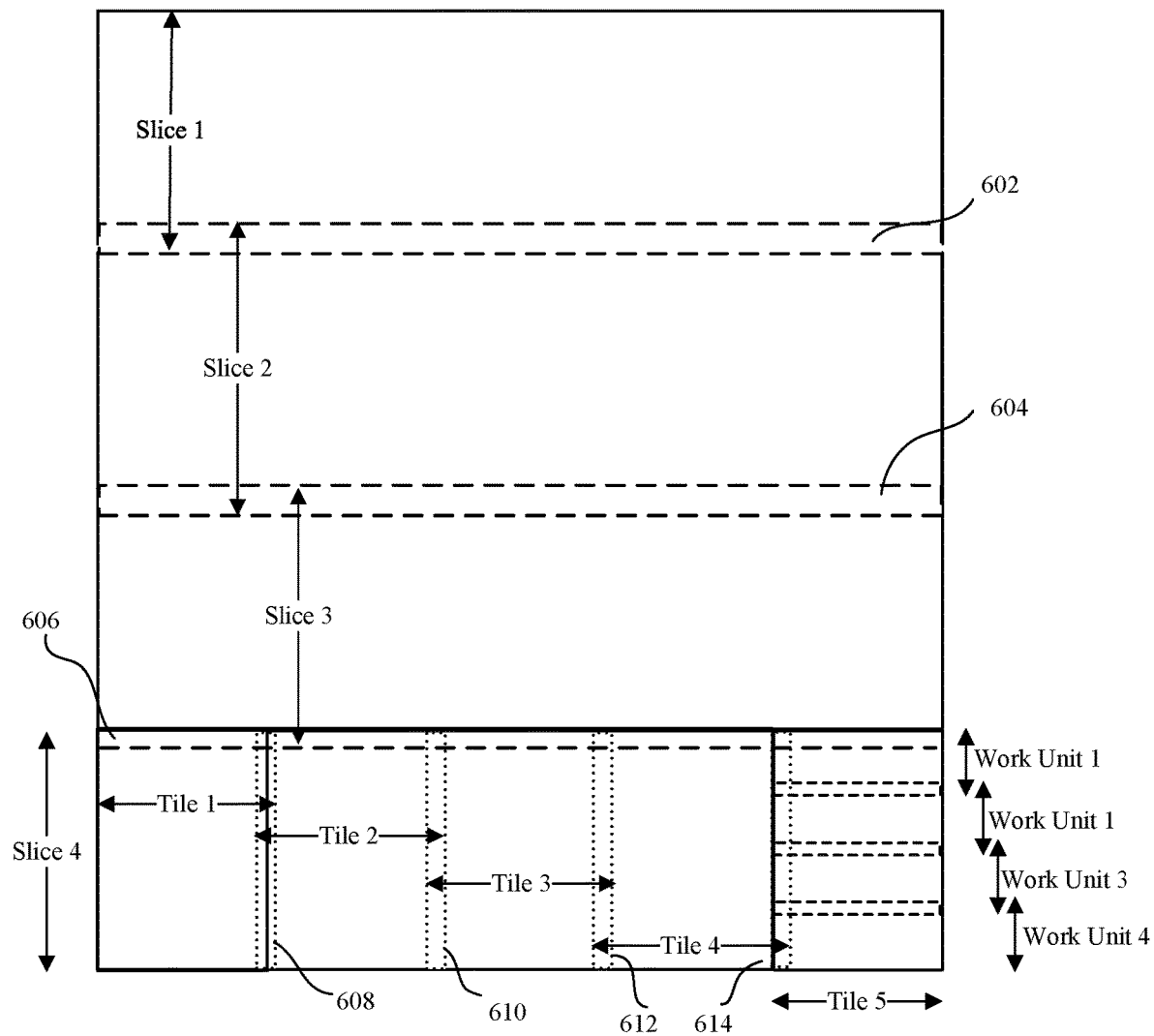
FIG. 6 is a conceptual diagram illustrating segmenting the input data into slices, tiles and work units, according to one embodiment.

In the loop for each convolution group is a processing loop for a slice of the input data. The entire input data for a convolution operation is segmented into multiple strips of slices in an overlapping manner, as shown in FIG. 6. The overlapping portions 602, 604, 606 are parts of the input data that are overfetched in two adjacent slices to provide spatial support for a corresponding kernel. The second outermost loop performs convolution operation for each slice in the input data. Within the loop for a slice is a processing loop for a tile of the slice. Each slice is segmented into a plurality of tiles, as shown in FIG. 6. The overlapping portions 608, 610, 612, 614 are parts of the input data in slice 4 that are overfetched in two adjacent tiles to provide spatial support for a corresponding kernel. The rightmost tile will typically have a width smaller than other tiles of the slice. In one embodiment, input data for each tile is loaded onto data buffer 318 in a read cycle and reused for operations in processing loops for the tile. In the processing loop for the tile is a processing loop for a work unit. Each tile is segmented into multiple work units as shown in FIG. 6. A work unit is a portion of the input data having a size that produces output values that fit into accumulator 414 of neural engine 314 during a single cycle of the computation core 416. Although the shape of each work unit is shown as a horizontal strip in FIG. 6, the shape of the work unit can be different depending on the shape and size of the tile. The work units also have overlapping parts that represent overfetched data to provide support for a corresponding kernel. Especially, work units for the last tile of a slice may have a shape of a vertical strip if the tile is tall. In one or more embodiments, the size of each work unit is 256 bytes. In such embodiments, for example, work units can be shaped to one of 16×16, 32×8, 64×4, 128×2 or 256×1 dimension.

For each work unit, an internal processing loop may be provided for an output channel group (OCG). The number of output channels produced for a given work unit by a single cycle of the computation core 416 is referred to as an OCG. Depending on operation modes, each neural engine 314 may process output data of different numbers of output channels (e.g., 8 channels, 32 channels) for a single load of input data into its input buffer circuit 402.

For each output channel group, an internal processing loop may be provided for an input channel (Cin). If an input stride is implemented to skip certain input data, loops for sub-input channels (Sub-Cin) may be provided within the processing loop for the input channel (Cin).

For each input channel or each sub-input channel, internal loops are provided for processing horizontal spatial support for a kernel and the vertical support within each horizontal spatial support. The spatial support refers to the input data for convolution with the kernel, and includes overfetched input data for performing convolution at the edges of the input data.

Overfetch refers to fetching additional input data in current slice, tile or work unit so that proper dimension of input data can be provided for convolution with a kernel. In one or more embodiments, overfetch is performed vertically between slices to obtain additional rows of input data (shown as overlapping portions 602, 604, 606 in FIG. 6), horizontally between tiles to obtain additional columns of input data (shown as overlapping portions 608, 610, 612, 614 in FIG. 6), and vertically between work units within a tile to obtain additional rows of input data.

For each spatial support for the kernel, an internal processing loop for an output channel (OC) is provided to generate output data for each output channel (Cout). In cases where output stride implements a spatial upsampling, an additional inner loop for processing each sub-output channel is provided. Loading of kernel coefficients and MAC operations are performed within the loop for the output channel (OC) or sub-output channel if an output stride is implemented, to generate output data for the output channel (OC) or sub-output channel.

The nested loop structure of FIG. 5 is merely illustrative. Loops may be omitted, added or structured differently depending on various factors. For example, if only a single convolution group is used, the outermost loop may be removed. Further, the loop structure for the horizontal spatial support and the vertical spatial support may be reversed.

In one or more embodiments, the operations associated dividing the input space into smaller units and processing these smaller units as described above with reference to FIGS. 5 and 6 are performed by rasterizers 714, 718, 720, 722 in various components of neural processor circuit 218. A rasterizer is a circuit in various components of neural processor circuit 218 that keeps track of the segment of the input/output data (e.g., group, work unit, input channel, output channel) and instructs the components of neural processor circuit for proper handling of the segment of the input data. For example, rasterizer 720 in buffer DMA 320 tracks tiles and slices received from system memory 230 while rasterizer 718 in data buffer 318 broadcasts in sequence work units for processing by the neural engines 314. Rasterizer 724 in kernel DMA 322 determines which kernels are to be received and distributed to neural engines 314, while rasterizers 714 in neural engines 314 operate shifters 410 in input buffer circuits 402 to forward correct portions 408 of input data to MAC 404, and send the finished output data 328 to the data buffer 318.

Figure 7:
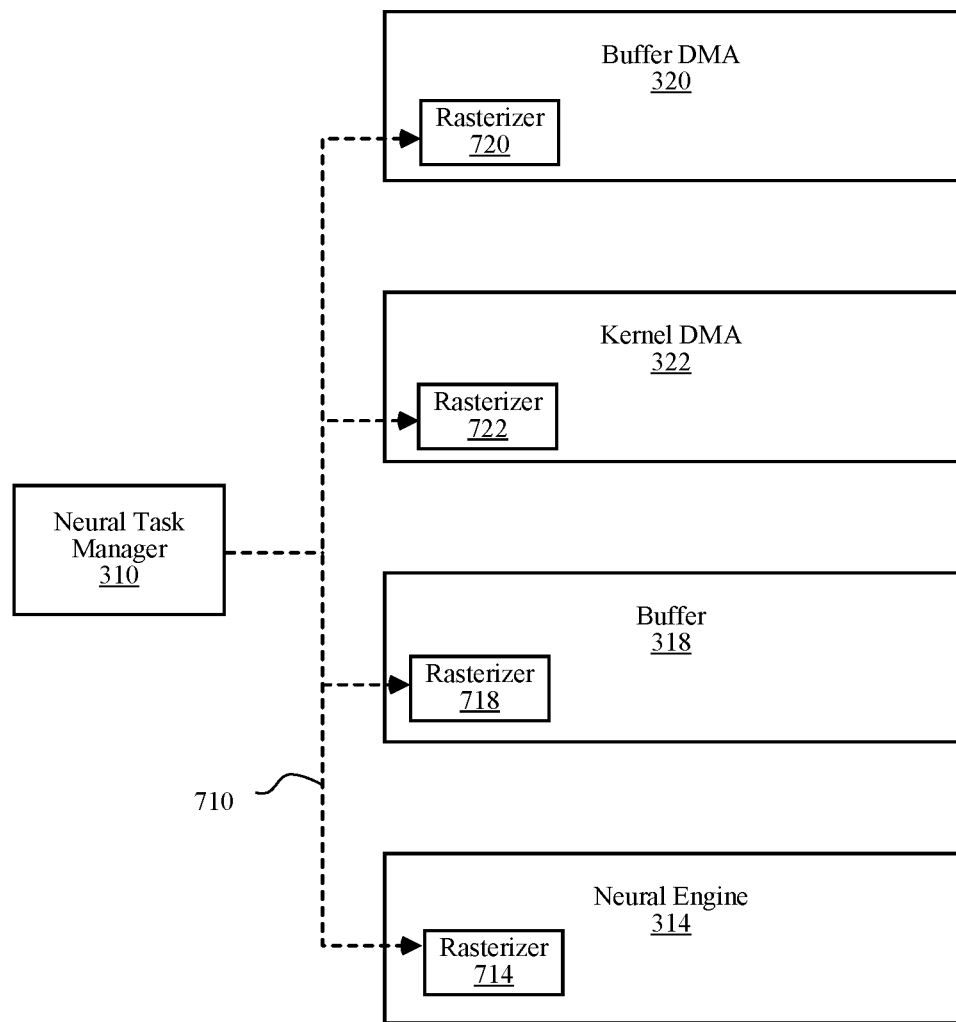
FIG. 7 is a diagram illustrating programming of rasterizers in components of the neural processor circuit, according to one embodiment.

FIG. 7 is a diagram illustrating programming of rasterizers 714, 718, 720, 722 in components 314, 318, 320, 322 of the neural processor circuit 218, according to one embodiment. To perform their functions, each of rasterizers 714, 718, 720, 722 receives task information 710 indicating how the input data and/or kernel data are to be segmented and to be handled by each component of the neural processor circuit 218. The task information includes information about particulars of the current layer (e.g., dimensions of input and output data, dimension of an associated kernel, types of padding at the boundaries of input data). Rasterizers 714, 718, 720, 722 may also receive constraints on their operations (e.g., whether to allow or disallow tile width over a threshold).

By providing rasterizers in different components of neural processor circuit 218, overhead in data transmitted between the components of the neural processor circuit 218 may be reduced. If a single central rasterizer is provided to control different components of the neural processor circuit 218, kernel data, input data, and output data transmitted between the components may be needed in these data to identify associated position in the loops of the task such as convolution group, tile, slice, work unit, input channel and output channel. By using distributed rasterizers, no separate metadata is needed to transmit the kernel data, input data and output data among components of the neural processor circuit 218.

Example Process at Neural Engine Architecture

Figure 8:
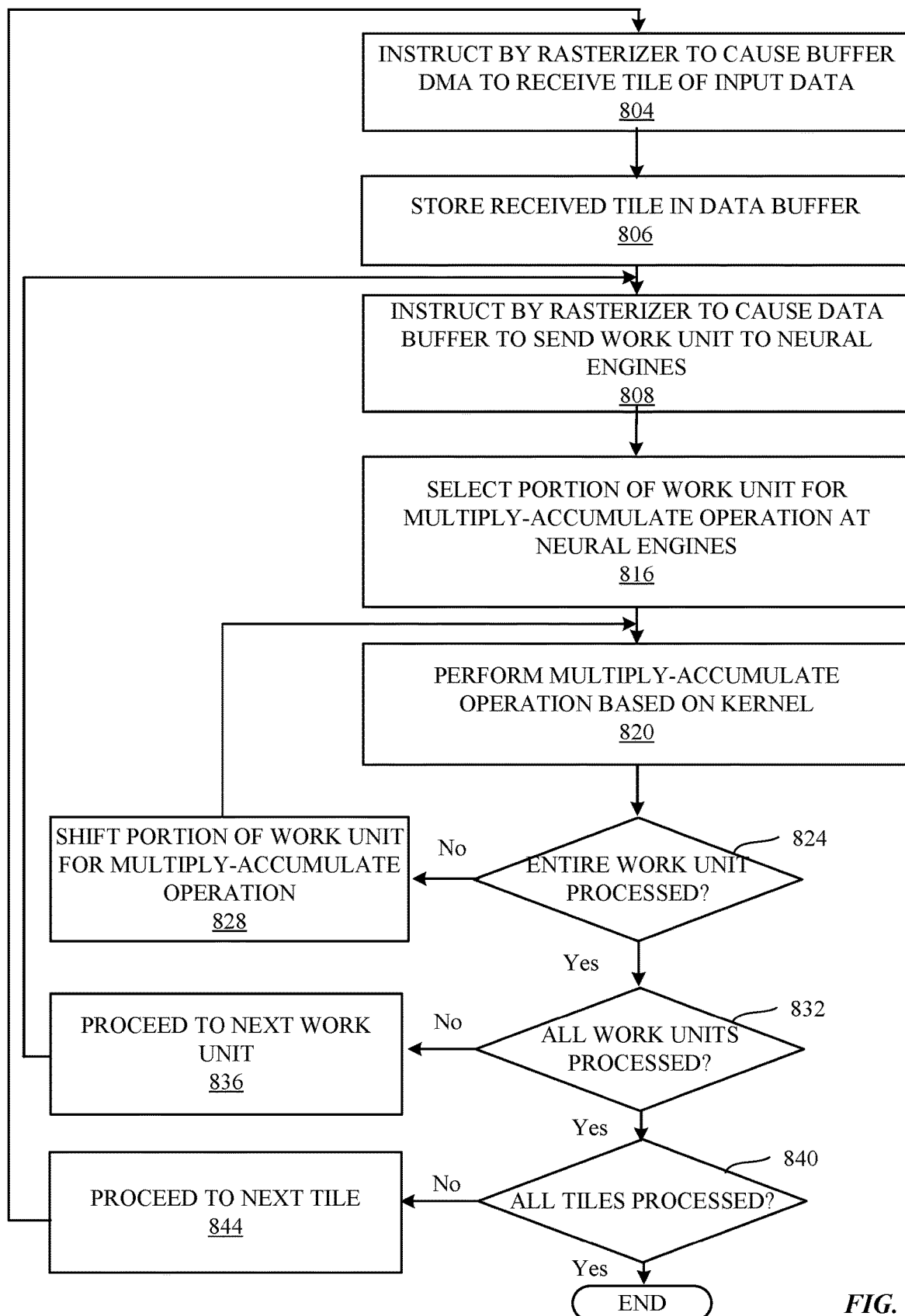
FIG. 8 is a flowchart illustrating a method of processing input data in a neural processor circuit, according to one embodiment.

FIG. 8 is a flowchart illustrating a method of processing input data in neural processor circuit 218, according to one embodiment. After neural task manager 310 programs rasterizers 714, 718, 720, 722, the process of operating buffer DMA 320 is initiated by rasterizer 720 instructing 804 buffer DMA 320 to cause buffer DMA 320 to receive a tile of input data from system memory 230. The tile received by buffer DMA 320 is stored 806 in data buffer 318.

Rasterizer 718 in data buffer 318 then instructs 808 data buffer 318 to send a work unit to one or more neural engines 314. The work unit is then stored in input buffer circuits 402 of the one or more neural engines 314.

In one or more embodiments, input buffer circuit 402 selects 816 a portion of work unit to be sent to MAC 404 to perform multiply-accumulate operation. Then MAC 404 performs 820 multiply-accumulate operations on the selected portion of the work unit using a corresponding kernel. Then it is determined 824 if the entire work unit is processed at one or more neural engines 314. If not, the selected portion of the work unit is shifted 828 by shifter 410 and returns to perform 820 another round of multiply-accumulate operations.

If it is determined 824 that the entire work unit was processed, then it proceeds to determine 832 if all work units in the tile was processed. If not, then the process proceeds 836 to the next work unit by having data buffer 318 send 808 a next work unit to one or more neural engines 314, and repeats the subsequent processes.

If it is determined 832 that all work units in the tile was processed by the neural engines 314, the process proceeds to determine 840 whether all tiles for the input data were processed. If not, the process proceeds 844 to a next tile by having rasterizer 720 instructs 804 buffer DMA 320 to receive a next tile from system memory 230 and repeats the subsequent processes.

If it is determined 840 that all tiles of the input data are processed, then the process ends for the current input data. Then, the process may be repeated to process the next input data or proceed to the next task.

Embodiments of the process as described above with reference to FIG. 8 are merely illustrative. Further loops may be embodied, as described above with reference to FIG. 5. Moreover, sequence of the process may be modified or omitted.

Example Multiply-Accumulator Circuit

Figure 9A:
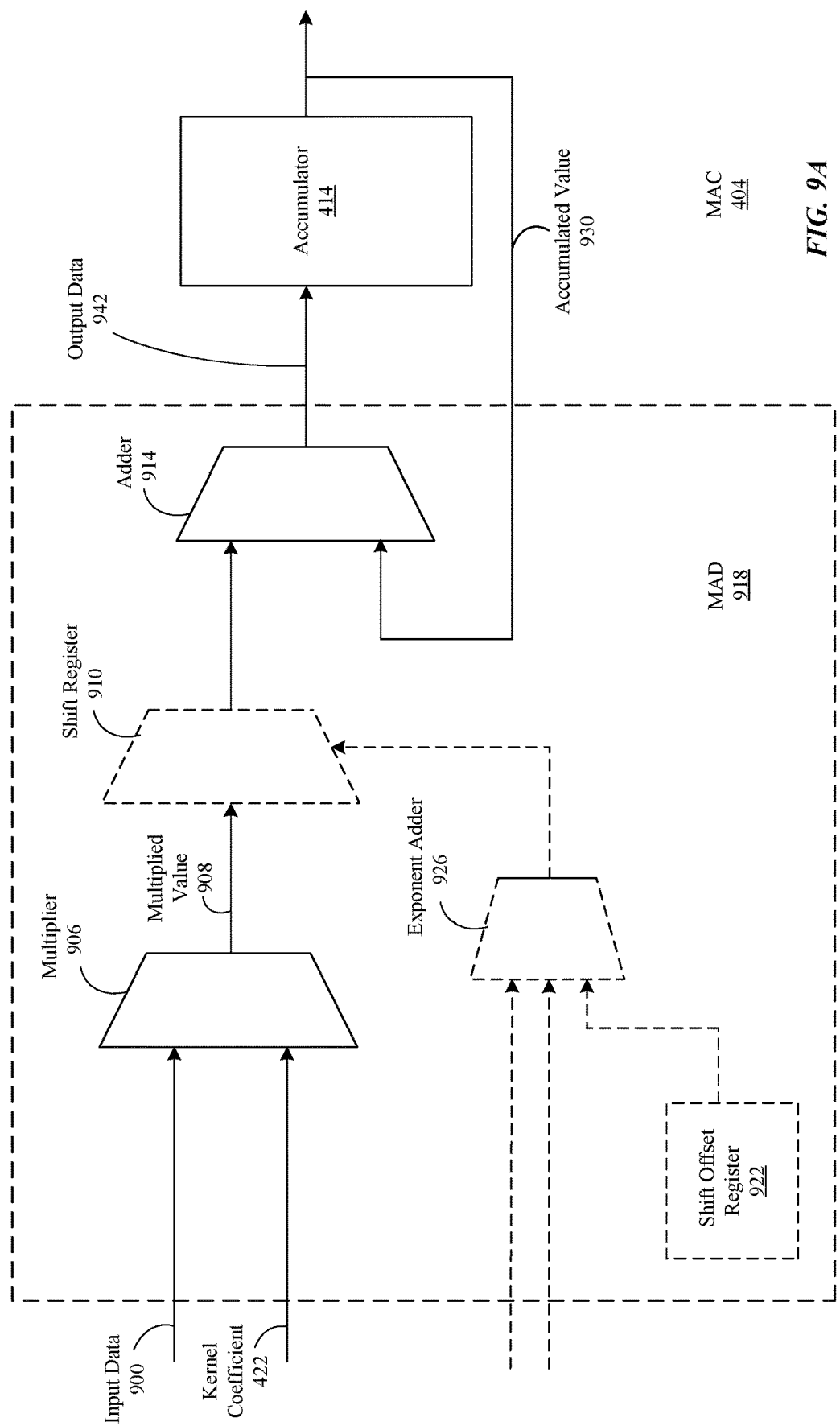
FIG. 9A is a block diagram illustrating a multiply-accumulator (MAC) circuit in a fixed-point mode of operation, according to one embodiment.
Figure 9B:
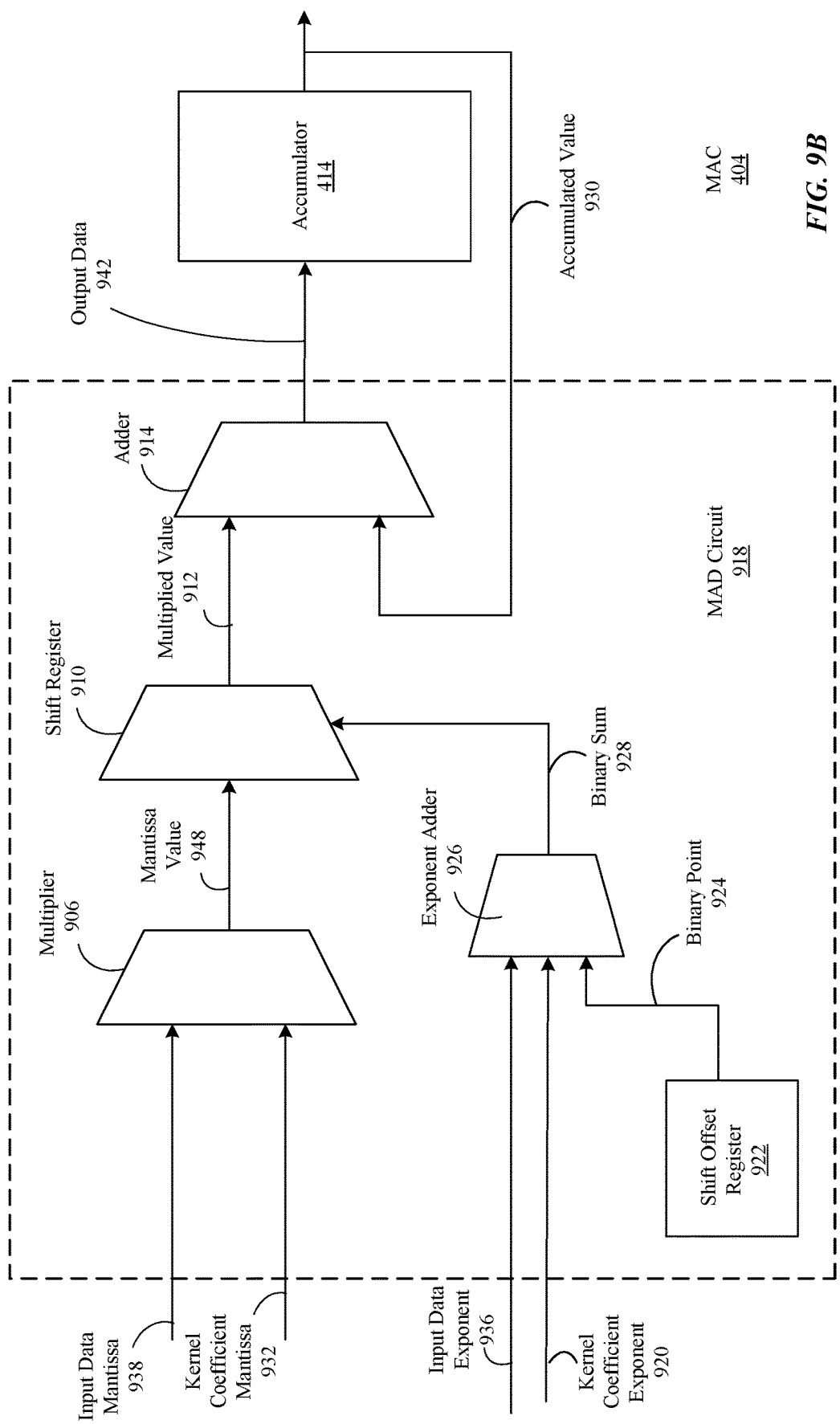
FIG. 9B is a block diagram illustrating a MAC circuit in a floating-point mode of operation, according to one embodiment.

FIGS. 9A and 9B illustrate an example multiply-accumulator (MAC) 404 that supports neural networking operations using fixed-point and floating-point operands operating in a fixed-point mode of operation, according to one embodiment. Each neural engine 314 of a neural processor circuit 218 may include the MAC 404. The MAC 404 includes a MAD 918 and an accumulator 414. Although a single MAD 918 is shown being coupled to the accumulator 414, each MAC 404 of a neural engine 314 may include multiple (e.g., 256) MADs that are coupled to the accumulator 414 as shown for the MAD 918. Each MAD 918 includes a multiplier 906, a shift register 910, an adder 914, a shift offset register 922, and an exponent adder 926. The multiplier 906 is coupled to the shift register 910. The exponent adder 926 is coupled to the shift offset register 922, and the shift register 910. The shift register 910 is coupled to an adder 914, which is coupled to an accumulator 414.

The neural processor circuit 218 may include multiple neural engines 314 where each neural engine 314 includes a MAC 404 with multiple MAD circuits coupled to an accumulator 414. For the sake of convenience, the operation of a single MAD 918, instead of multiple MADs, is discussed herein. Multiple MADs 918 may operate in parallel using different operands to execute a neural network operation.

The MAC 404 may operate in a floating-point mode of operation or a fixed-point mode of operation. In the fixed-point mode of operation, the MAC 404 receives fixed-point (e.g., INT8) input data 900 for convolution with a fixed-point kernel coefficient 422. In a floating-point mode of operation, the MAC 404 receives 16-bit floating-point (e.g., FP16) input data 900 for convolution with a floating-point kernel coefficient 422. In some embodiments, the neural processor circuit 218 includes 8 neural engines, each neural engine 314 including 256 MADs. In the fixed-point mode, the neural processor circuit 218 receives as input data 256 bytes which is treated as 256 8-bit integers, multiplies the 256 8-bit integers by a single kernel coefficient, and produces 256 partial-product results (which is accumulate into one of the 256-component accumulators), eventually producing a single 256-component result, which is typically emitted as a 256-byte result (256 8-bit integers). For a neural processor circuit 218 including 8 neural engines 314 and each neural engine 314 including 256 MADs, the floating-point mode of operation supports 128 multiply-add operations in parallel for each neural engine 314 while processing a 256-byte work unit in a processing cycle across the 8 neural engines. In the floating-point mode, the neural processor circuit 218 receives as input data 256 bytes which is treat as 128 16-bit floating-point numbers (FP16). The neural processor circuit 218 also receives two kernel coefficients, and multiplies the 128 input floats by both kernel coefficients, producing two 128-component results. The resulting 256 component partial-product (2×128) are accumulated into a single 256-component accumulator, and eventually produce two 128-component outputs. This is typically emitted as a pair of 128-component FP16 channels.

The MAC 404 may include 256 multiply-add (MAD) 918 circuits to process work units. Each MAD 918 uses an accumulator 414 for multi-processing cycle multiply-add operations within the MAC 404. In some embodiments, the MAC 404 includes a 32-bit accumulator used by the MAC 404 for storing the output data of MADs as accumulated values 930 from one or more processing cycles. Each 32-bit entry in the accumulator 414 may be used as an accumulated value 930 for an addition operation with the multiplied value 908/912 of a subsequent (e.g., next) processing cycle. The accumulator 414 selectively provides the output data to the MAD 918 as an accumulated value 930, or the post-processor 428 when accumulation of multiplied values from multiple processing cycles is complete.

Example Fixed-Point Convolution

FIG. 9A illustrates the shift register 922, exponent adder 926, and shift register 910 are deactivated in the fixed-point mode of operation, according to one embodiment. The multiplier 906 is coupled to the input of the MAD 918 to receive input data 900 and a kernel coefficient 422, and multiplies the input data 900 and the kernel coefficient 422 to generate a multiplied value 908.

The multiplier 906 is coupled to the shift register 910 that bypasses the multiplied value 908 to the adder 914. The adder 914 adds the multiplied value 908 of the current processing with an accumulated value 930 from the accumulator 414 from one or more prior processing cycles to generate output data 942. The accumulated value 930 that is provided to the adder 914 may include an output from the MAD 918. If there is no accumulated value 930 to add with the multiplied value 908, the multiplied value 908 is stored in the accumulator 414 as the output data 942. The stored output data 942 may be provided as an input accumulated value 930 to an adder 914 of a MAD 918 for a subsequent processing cycle.

The MAC 404 may execute multiple (e.g., 256) multiply-accumulate operations per processing cycle using input data 900 and kernel coefficients 422 having an INT8 precision. Each of neural engines 314 may process multiple (e.g., 8) output channels (e.g., one output channel per accumulator 414). In some embodiments, the accumulators 414 can act either as a set of eight 256-component accumulators (which allows the neural processor circuit 218 to compute eight output channels at a time per pass through the input data), or they can be divided into two four-accumulator pools. These are used as a "double buffer"—the MAC 404 portion of the neural engine 314 computes four output channels while the post-processor 428 consumes the previously-computed output (the previous four computed output channels). Operating in this "ping pong" mode allows the post-process to overlap with the convolution taking place in the MAC 404, but at a cost of (potentially) requiring twice as many passes through the input data (because half as many output channels are produced per pass).

In some embodiments, following the fixed-point multiplication, the MAD 918 provides the fixed-point multiplied value 908 to the adder 914 to be added to the accumulated value 930 stored in the accumulator 414 from one or more previous processing cycles. Because the fixed-point multiplied value 908 does not require realignment, the shift register 910, exponent adder 926, and shift offset register 922 can be turned off or operated in a low power mode during the fixed-point mode of operation for power conservation, and are bypassed before reaching the adder 914, as indicated by the dotted lines in FIG. 9A. In some embodiments, the fixed-point multiplied value 908 is sign-extended to 32-bits and added to fixed-point 32-bit accumulated value 930 from the accumulator 414. The fixed-point 32-bit sum, or output data 942, is then stored in the accumulator to be used as an accumulated value 930 in a subsequent processing cycle.

Example Floating-Point Convolution

FIG. 9B illustrates the shift register 922, exponent adder 926, and shift register 910 activated in the floating-point mode of operation, according to one embodiment. For the floating-point mode of operation, the input data is separated into an input data mantissa 938 and an input data exponent 936.

The kernel coefficient is separated into a kernel coefficient mantissa 932, and a kernel coefficient exponent 920. The multiplier 906 receives the input data mantissa 938 and the kernel coefficient mantissa 932, and multiplies these values to generate a mantissa value 948. The exponent adder 926 adds the input data exponent 936 and the kernel coefficient exponent 920 to generate an exponent value, and the exponent adder 926 modifies the exponent value using an offset value from the shift offset register 922.

The shift register 910 generates the multiplied value by realigning the mantissa value 948 based on the exponent value 928 to generate a multiplied value 912. The adder 914 adds the multiplied value 912 with an accumulator value 930 from the accumulator 414 from one or more prior processing cycles. The accumulated value 930 that is provided to the adder 914 may include an output from the MAD 918. If there is no accumulated value 930 to add with the multiplied value 912, the multiplied value 912 is stored in the accumulator 414. The stored multiplied value 912 may be provided as an input accumulated value 930 to an adder 914 of a MAD 918 for a subsequent processing cycle.

In some embodiments, the shift register 910 uses binary sum to determine a shifting amount for aligning the binary point 924 of the multiplied value 912 for fixed-point addition in the adder 914 (e.g., converting the floating-point multiplied value 908 into a fixed-point integer). The shift register 910 uses an arithmetic shift to align the binary point 924 and extend bit size of the multiplied value 908 (e.g., extend a 23-bit multiplied value 908 to 32-bits) that corresponds to the bit size of the accumulator 414.

In some embodiments, the shift offset register 922 contains a 5-bit value indicating a binary point 924 position to be used in part by the shift register 910 for aligning a floating-point multiplied value to a fixed point precision of the accumulator 414.

In some embodiments, the exponent adder 926 takes input data exponent 936, kernel coefficient exponent 920, and binary point 924 as input to produce an exponent value (or binary sum 928) which is a 5-bit binary sum. The binary sum is used to align a floating-point multiplied value 908 for fixed-point addition by the adder 914.

In some embodiments, the floating-point precision may include processing operands having more bits than those used in the fixed-point mode of operation. For example, because FP16 includes twice as many bits as INT8, a work unit of 256-bytes may require a different MAD arrangement than the arrangement used for fixed-point mode. In this example, the 256-byte work unit would utilize only 128 MADs 918 in the MAC 404 rather than 256, decreasing the output bandwidth to half of that utilized in the fixed-point mode of operation. In order to compensate for a potential loss of bandwidth, a first portion of MAD 918 circuits can be used for processing multiply-accumulate operations using the work unit and a first kernel coefficient 422, and a second portion of MAD 918 circuits can be used from processing the same work unit using a second kernel coefficient. Whereas in the fixed-point mode of operation one kernel coefficient 422 is processed per clock cycle by the MAC 404, using a second kernel coefficient for processing the same work unit in parallel with a first kernel coefficient affords the MAC 404 circuit the full use of all 256 MADs 918. In some embodiments, 128 multiply-accumulate operations are designated for an even output channel and 128 multiply-accumulate operations are designated for an odd output channel. In total, the neural engine 314 can generate two output channels per each processing cycle of the neural engine 314 in the floating-point mode of operation.

In some embodiments, the MAC 404 receives input data 900 and kernel coefficients 422 in the floating-point mode of operation similarly to receiving input data 900 and kernel coefficients 422 in the fixed-point mode of operation. For example, the input buffer circuit 402 broadcasts 256-bytes of input data 900 portions distributed across 256 MAD 918 circuits, where each MAD 918 is mapped to a portion of input data (e.g., pixel 0 sent to MAD0, pixel 1 sent to MAD1, and so on). However, in order to make use of all 256 MAD 918 circuits, two separate kernel coefficients 422 are processed with the same pixel data 900 from the work unit. In some embodiments, kernel coefficients with a value of 0 can be skipped, thus taking advantage of kernel sparsity in order to conserve power and optimize each processing cycle.

In some embodiments, each floating point operand can be represented as $s*m*2^e$, where s represents the sign bit, m represents the mantissa, and e represents the exponent. Rather than introducing separate components to handle a floating-point mode or a fixed-point mode of operation, the MAD 918 separates each floating point input into its constituent parts, separating the sign bit and mantissa bits from the exponent bits. This enables the MAD 918 to process floating-point (e.g., FP16) precision using the shared circuitry that is used for processing fixed-point (e.g., INT8) by activating the exponent adder 926, shift register 910, and shift offset register 922 in the floating-point mode of operation.

Figure 10:
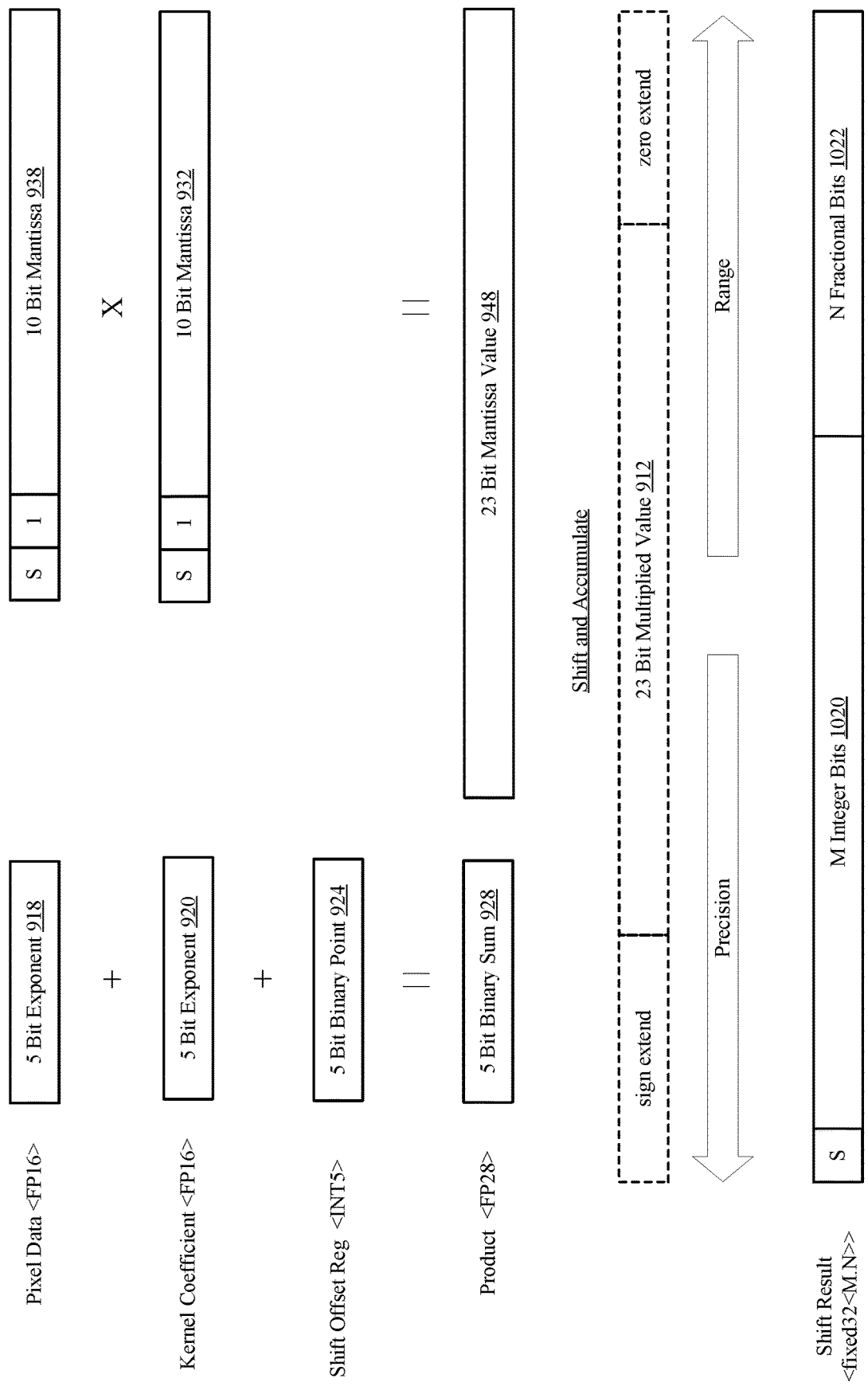
FIG. 10 is a diagram illustrating a process for multiplying floating-point input data and a kernel coefficient, according to one embodiment.

FIG. 10 illustrates a process for determining a binary point position and aligning a multiplied value 908, according to one embodiment. As shown, the input data mantissa 938 and kernel coefficient mantissa 932 have a precision of 1.10 (i.e., one bit for MSB integer representation and 10 bits for mantissa) and values ranging from 1 to 2 (i.e., 1.0000000000 to 1.1111111111~2). The input data mantissa 938 and kernel coefficient mantissa 932 are multiplied by the multiplier 906, resulting in a 23-bit multiplied value 912 with a precision of 2.20 (i.e., two bits for MSB integer representation and 20 bits for mantissa) and values ranging from 1 to 4 (i.e., 01.00000000000000000000 to 11.11111111000000000001~4).

To define the magnitude of the 23-bit multiplied value 912, the exponents of both inputs are added with an additional binary point 924 value in the exponent adder 926. Input data exponent 936 is added to kernel coefficient exponent 920 in addition to a 5-bit binary point 924 value in the shift offset register 922. The binary point 924 is a configurable global offset value determined by the compiler during a compilation operation, and may be set based in part on kernel size. For example, a 4×4 kernel used for convolution involves more multiply-add operations and generates more partial products than a 2×2 kernel. In this case, the compiler may assign a lower binary point 924 value in order to accommodate a larger range for multiply-accumulate operations to reduce the likelihood of overflow. Conversely, for smaller kernel sizes (e.g., the 2×2 kernel), fewer multiply-accumulate operations are performed due to having fewer kernel coefficients. In this case, the compiler may designate a larger binary point 924 value to afford a larger precision with a smaller range. In one or more embodiments, these trade-offs are determined by a trained model during compilation. The exponent adder 926 adds the binary point 924 to the input data exponent 936 and the kernel coefficient exponent 920 to generate a 5-bit binary sum 928.

The binary sum 928 value is used to drive the shift register 910 in order to align the multiplied value 912 for addition with the (e.g., 32-bit) fixed-point accumulated value 930 in the accumulator 414. As illustrated in FIG. 10, the 23-bit multiplied value 912 is shifted according to the amount of precision and/or range needed to support addition and accumulation operations. The shift register 910 performs arithmetic shifts on the 23-bit multiplied value 912 to maintain its sign while aligning the 23-bit multiplied value 912 using the binary point 924. The most-significant bits (MSB) are sign extended on the left, and remaining bits are padded with zeros on the right, producing a fixed-point 32-bit multiplied value 912 comprised of a sign bit, M integer bits 1020, and N fractional bits 1022. The accumulators may use two's complement representations or signed-magnitude representations.

The fixed-point 32-bit multiplied value 912 is sent to the adder 914 for addition operations with either a value of 0 or a configurable bias value if operating in a first processing cycle, or fixed-point 32-bit accumulated value 930 from previous processing cycles if operating in a subsequent processing cycle. In some embodiments, fixed-point representations of floating-point values in the accumulator 414 are converted back to floating-point values (e.g., FP16) in post-processing.

Binary Point Configuration for Mixed Precision Convolution

The MAC 404 may support multiply-accumulate operations using input data 900 and kernel coefficients 422 of different precisions. The components of each MAD 918 enable the MAC 404 to process two operands having respective fixed-point (e.g., INT8) and floating-point (e.g., FP16) precisions in the same multiply-add operations, and provide for the proper alignment needed for accumulation.

A predetermined binary point 924 position specifies the amount of shift applied by the shift register 910 based on the types of input received. For example, if two inputs are received having INT8 precision, the binary point location is 0. If two inputs are received having an INT8 precision and a FP16 precision, respectively, the binary point location is 10. Lastly, if two inputs are received having FP16 precision, the binary point location is 20.

For example, if FP16 input data 900 is received with an INT8 kernel coefficient 422, the MAD 918 can separate the FP16 input data 900 into its contingent parts, forming an input data mantissa 938 and an input data exponent 936 as discussed above with reference to FIG. 9B. However, the MAD 918 also effectively separates the INT8 kernel coefficient by assigning predetermined binary point 924 value to be processed in the addition operation of the exponent adder 926. The input data exponent 936 is added to a kernel coefficient exponent 920 value of 0 and the binary point 924 value of 10 (e.g., predetermined binary point 924 value for INT8 and FP16 operands). In addition, the input data mantissa 938 is multiplied by the INT8 kernel coefficient 422 in the multiplier 906. The multiplied value 908 is then shifted accordingly and added to the processed results in the accumulator 414. Similarly, the MAD 918 may receive INT8 input data 900 and a FP16 kernel coefficient producing the same result.

Example Processes at MAD Circuit

Figure 11:
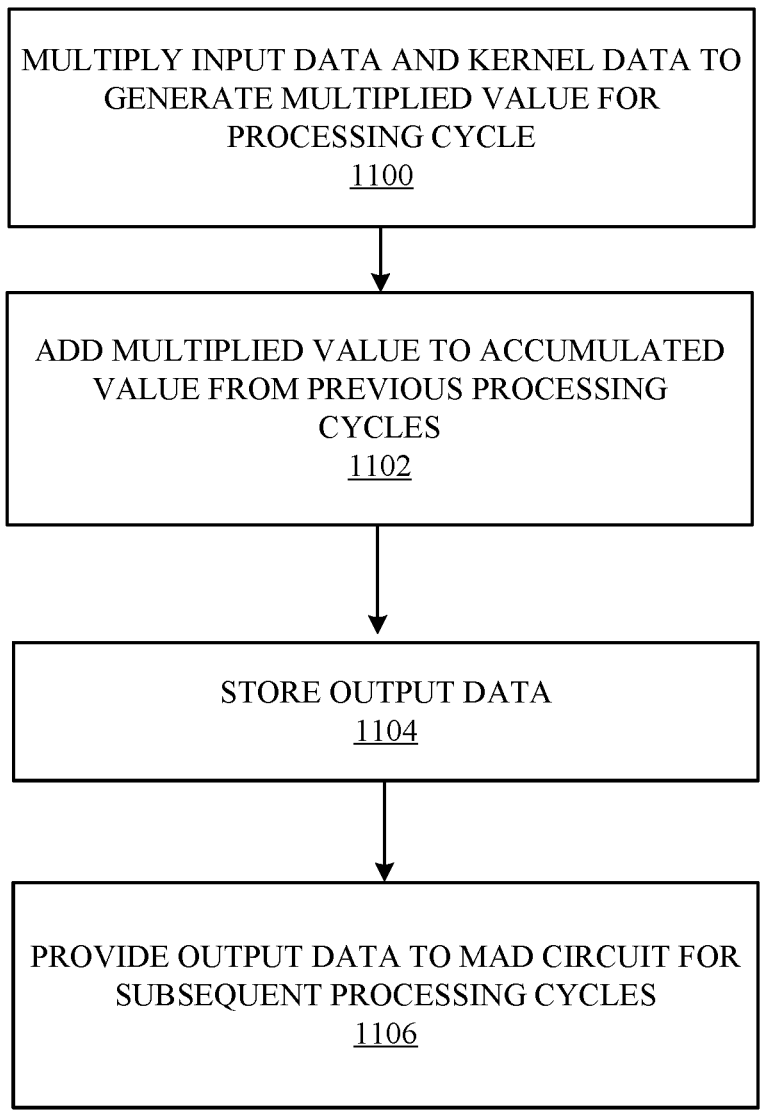
FIG. 11 is a flowchart illustrating a method of performing multiply-add operations in a MAC circuit, according to one embodiment.

FIG. 11 is a flowchart illustrating a method of performing multiply-accumulation operations on input data and kernel coefficients having either fixed-point precision or floating-point precision, according to one embodiment.

First, the MAD circuit multiplies 1100 input data and kernel data to generate a multiplied value of a processing cycle. Then, the MAD circuit adds 1102 the multiplied value to a first accumulated value from a previous processing cycle to generate output data. The input data and kernel coefficients may be fixed point or floating point values. If floating point values are used, the multiplied value may be converted to a fixed point precision of the accumulated value stored in the accumulator.

The accumulator stores 1104 the output data obtained as a result of the addition. Then, the accumulator provides 1106 the output data to the MAD circuit as an accumulated value for subsequent processing cycles.

Figure 12:
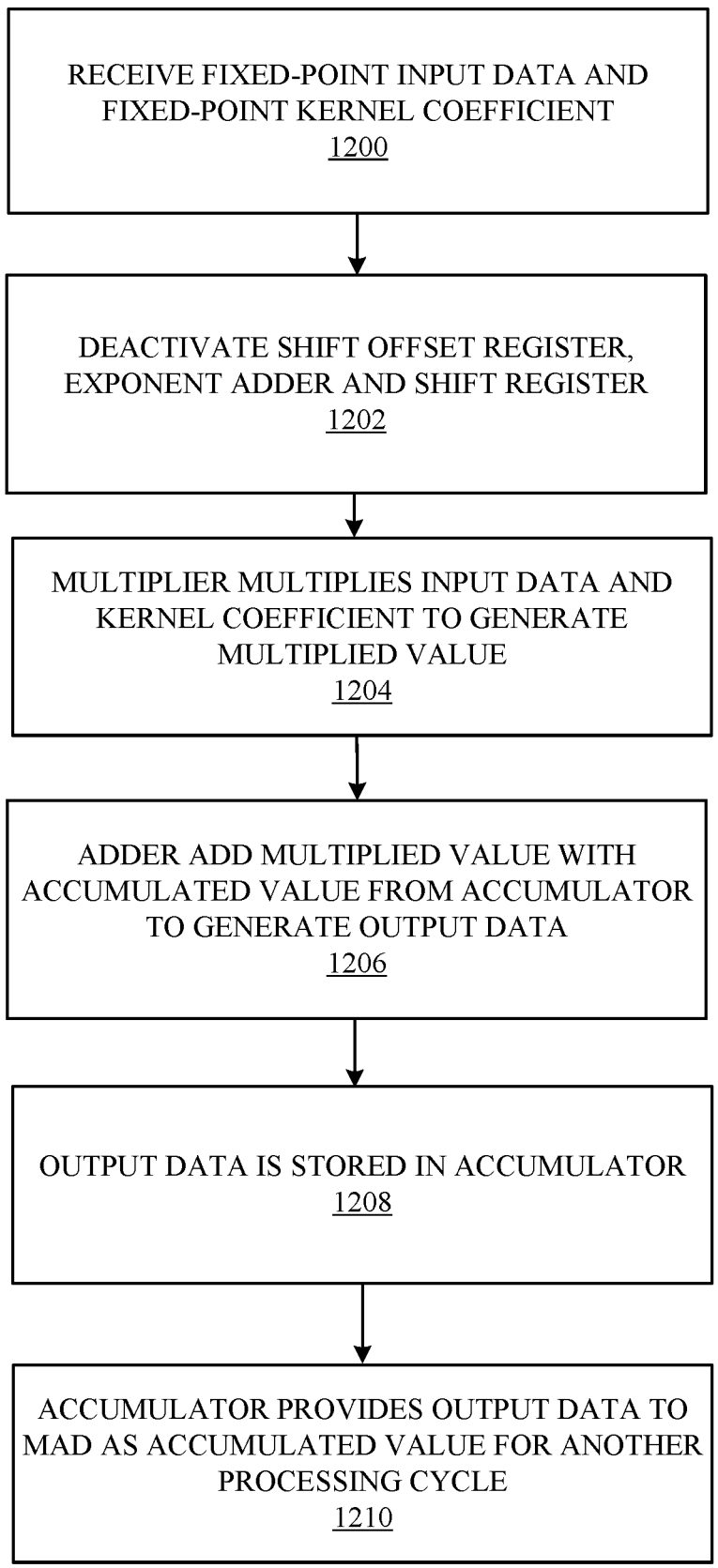
FIG. 12 is a flowchart illustrating a method of processing fixed-point input data and kernel coefficients, according to one embodiment.

FIG. 12 illustrates a method of processing fixed-point input data by a kernel coefficient, according to one embodiment. The MAC receives 1200 fixed-point input data and a fixed-point kernel coefficient. The shift offset register, exponent adder, and shift register of the MAC is deactivated for the fixed-point mode of operation.

The multiplier multiplies 1204 the input data and kernel coefficient to generate a multiplied value. Then, the adder adds 1206 the multiplied value with the accumulated value from the accumulator to generate output data.

The output data is stored 1208 in accumulator. The accumulator provides 1210 output data to MAD as accumulated value for another processing cycle.

Figure 13:
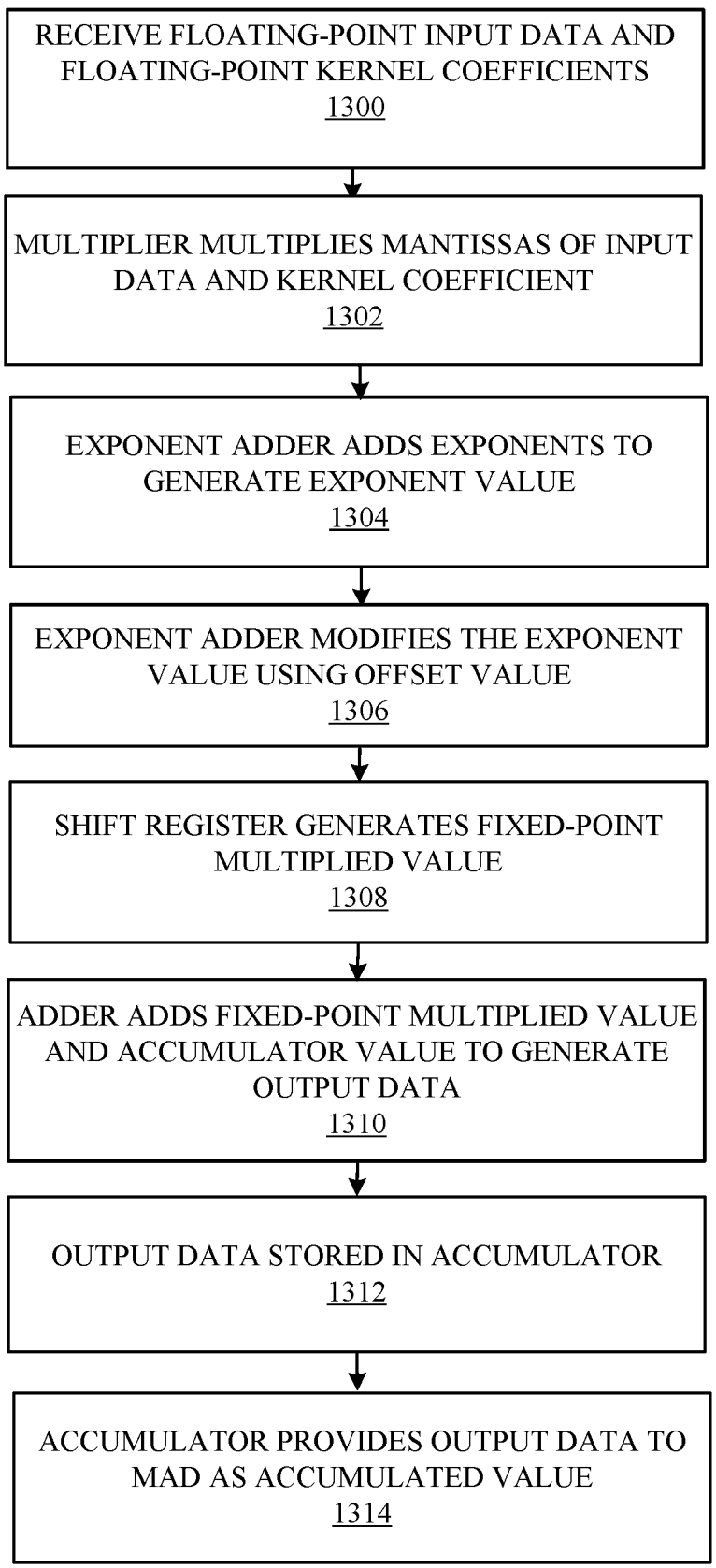
FIG. 13 is a flowchart illustrating a method of processing floating-point input data and kernel coefficients, according to one embodiment.

FIG. 13 illustrates an example method of processing floating-point input data by kernel coefficients, according to one embodiment. The MAD receives 1300 floating-point input data and floating-point kernel coefficients.

The multiplier multiplies 1302 the mantissas of the input data and kernel coefficients. The exponent adder adds 1304 the exponents to generate an exponent value. The exponent adder modifies 1306 the exponent value using offset value from the shift register offset to match the multiplied value with a fixed-point precision of the accumulator circuit.

The shift register generates 1308 the multiplied value by realigning the mantissa value based on the exponent value. The adder adds 1310 the multiplied value and the accumulator value from the accumulator to generate output data.

The output data is stored 1312 in the accumulator. The accumulator provides 1314 the output data to MAD as accumulated value for another processing cycle.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit for accelerating processing of neural networks, comprising:
a neural engine circuit, including:
a multiply-add (MAD) circuit comprising a shift register and an exponent adder that are used in a floating point mode, the MAD circuit configured to:
receive fixed point input data and a fixed point kernel coefficient in a fixed point mode;
deactivate the shift register and the exponent adder; and
multiply the fixed point input data and the fixed point kernel coefficient to generate a multiplied value; and
an accumulator circuit coupled to the MAD circuit, the accumulator circuit configured to generate an output data by accumulating one or more multiplied values generated by the MAD circuit.

2. The neural processor circuit of claim 1, wherein the neural engine circuit is configured to receive a first input data that is represented as floating point data in the floating point mode, and a second input data that is represented as fixed point data in a fixed point mode.

3. The neural processor circuit of claim 1, wherein:
the neural engine circuit includes a plurality of MAD circuits coupled to the accumulator circuit;
a first subset of the plurality of MAD circuits is configured to generate first output data of a first channel using an input data and a first kernel coefficient; and
a second subset of the MAD circuits is configured to generate second output data of a second channel using the input data and a second kernel coefficient.

4. The neural processor circuit of claim 3, wherein the neural engine circuit further comprises:
a kernel extract circuit configured to:
provide the first kernel coefficient to the first subset of the plurality of MAD circuits; and
provide the second kernel coefficient to the second subset of the plurality of MAD circuits; and
an input buffer circuit configured to provide the input data to the first subset of the plurality of MAD circuits and the second subset of the plurality of MAD circuits.

5. The neural processor circuit of claim 4, wherein the input buffer circuit comprises a shifter that shifts read locations of the input buffer circuit to change portions of the input data selected to be sent to the plurality of MAD circuits.

6. The neural processor circuit of claim 1, wherein the neural engine circuit is configurable to operate in the floating point mode, and wherein the MAD circuit, in the floating point mode is configured to modify an exponent value of a second multiplied value using an offset value to match the multiplied value to a fixed point precision.

7. The neural processor circuit of claim 6, wherein the MAD circuit includes a multiplier configured to, in the floating point mode, multiply a mantissa of floating point input data and a mantissa of a floating point kernel coefficient to generate a mantissa value.

8. The neural processor circuit of claim 6, wherein, in the floating point mode, the shift register is activated, the shift register configured to provide the offset value to the exponent adder, and the exponent adder configured to modify the exponent value using the offset value to match the second multiplied value.

9. The neural processor circuit of claim 1, further comprising a post-processor circuit, and wherein the accumulator circuit selectively provides the output data to the MAD circuit or the post-processor circuit.

10. The neural processor circuit of claim 1, wherein the MAD circuit includes:
a multiplier configured to multiply an input data and a kernel coefficient to generate the multiplied value; and
an adder coupled to the multiplier and the accumulator circuit, the adder configured to add the multiplied value with an accumulated value.

11. A method of operating a neural processor circuit for accelerating processing of neural networks, the method comprising:
receiving fixed point input data and a fixed point kernel coefficient in a fixed point mode of a multiply-add (MAD) circuit, the MAD circuit comprising a shift register and an exponent adder that are used in a floating point mode;
deactivating the shift register and the exponent adder;
multiplying the fixed point input data and the fixed point kernel coefficient to generate a multiplied value; and
generating, at an accumulator circuit coupled to the MAD circuit, an output data by accumulating one or more multiplied values generated by the MAD circuit.

12. The method of claim 11, further comprising:
receiving a first input data that is represented as floating point data in the floating point mode, and a second input data that is represented as fixed point data in a fixed point mode.

13. The method of claim 11, wherein the neural processor circuit includes a plurality of MAD circuits, the method further comprising:
generating, by a first subset of the plurality of MAD circuits, first output data of a first channel using an input data and a first kernel coefficient; and
generating, by a second subset of the plurality of MAD circuits, second output data of a second channel using the input data and a second kernel coefficient.

14. The method of claim 13, further comprising:
storing the input data to the first subset of the plurality of MAD circuits and the second subset of the plurality of MAD circuits in an input buffer;
providing the first kernel coefficient to the first subset of the plurality of MAD circuits; and
providing the second kernel coefficient to the second subset of the plurality of MAD circuits.

15. The method of claim 14, further comprising shifting read locations of the input buffer circuit to change portions of the input data selected to be sent to the plurality of MAD circuits.

16. The method of claim 11, wherein the neural processor circuit is configurable to operate in the floating point mode, and wherein the MAD circuit, in the floating point mode is configured to modify an exponent value of a second multiplied value using an offset value to match the multiplied value to a fixed point precision.

17. The method of claim 16, further comprising, in the floating point mode, multiplying a mantissa of floating point input data and a mantissa of a floating point kernel coefficient to generate a mantissa value.

18. An electronic device, comprising:
system memory configured to store a neural network; and
a neural processor circuit for accelerating processing of the neural network, the neural processor circuit comprising a multiply-add (MAD) circuit and an accumulator circuit, the MAD circuit comprising a shift register and an exponent adder that are used in a floating point mode, the neural processor circuit configured to:
receive fixed point input data and a fixed point kernel coefficient in a fixed point mode;
deactivate the shift register and the exponent adder;
multiply the fixed point input data and the fixed point kernel coefficient to generate a multiplied value; and
generate an output data by accumulating one or more multiplied values generated by the MAD circuit.

19. The electronic device of claim 18, the neural processor circuit includes a plurality of MAD circuits coupled to the accumulator circuit;
a first subset of the plurality of MAD circuits is configured to generate first output data of a first channel using an input data and a first kernel coefficient; and
a second subset of the plurality of MAD circuits is configured to generate second output data of a second channel using the input data and a second kernel coefficient.

20. The electronic device of claim 18, wherein the neural processor circuit is configurable to operate in a floating point mode, and wherein the MAD circuit, in the floating point mode is configured to modify an exponent value of a second multiplied value using an offset value to match the multiplied value to a fixed point precision.

* * * * *

UNITED STATES PATENT AND TRADEMARK OFFICE
CERTIFICATE OF CORRECTION

PATENT NO. : 11,880,757 B2  
APPLICATION NO. : 18/095960  
DATED : January 23, 2024  
INVENTOR(S) : Mills Page 1 of 1

It is certified that error appears in the above-identified patent and that said Letters Patent is hereby corrected as shown below:

In the Specification

In Column 2, Line 56, delete "detail" and insert -- detailed --, therefor.

In Column 3, Line 28, delete "California" and insert -- California. --, therefor.

In Column 11, Line 26, delete "322" and insert -- 324 --, therefor.

In the Claims

In Column 18, Claim 3, Line 46, after "the", insert -- plurality of --.

Signed and Sealed this  
Tenth Day of June, 2025

Coke Morgan Stewart  
*Acting Director of the United States Patent and Trademark Office*